United States Patent
Kadoi

(10) Patent No.: US 12,294,096 B2
(45) Date of Patent: May 6, 2025

(54) BATTERY AND METHOD OF MANUFACTURING SAME

(71) Applicant: Prime Planet Energy & Solutions, Inc., Tokyo (JP)

(72) Inventor: Masafumi Kadoi, Chita (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 67 days.

(21) Appl. No.: 17/525,972

(22) Filed: Nov. 15, 2021

(65) Prior Publication Data
US 2022/0158279 A1     May 19, 2022

(30) Foreign Application Priority Data
Nov. 16, 2020   (JP) ................. 2020-190182

(51) Int. Cl.
*H01M 50/176*     (2021.01)
*H01M 50/16*      (2021.01)
(Continued)

(52) U.S. Cl.
CPC ......... *H01M 50/176* (2021.01); *H01M 50/16* (2021.01); *H01M 50/533* (2021.01);
(Continued)

(58) Field of Classification Search
CPC .......... H01M 10/0525; H01M 10/058; H01M 50/176; H01M 50/16; H01M 50/533;
(Continued)

(56) References Cited

U.S. PATENT DOCUMENTS

2011/0300414 A1*  12/2011  Baek ............. H01M 50/169
                                                     429/7
2012/0064380 A1*  3/2012  Kim ............... H01M 50/103
                                                     429/66
(Continued)

FOREIGN PATENT DOCUMENTS

CN      102270752 A    12/2011
CN      111628135 A     9/2020
(Continued)

OTHER PUBLICATIONS

English Translation of JP2010089156 A; Joining method and utilization thereof; Toyota; Apr. 22, 2010 (Year: 2010).*
(Continued)

*Primary Examiner* — Matthew T Martin
*Assistant Examiner* — Adam J Francis
(74) *Attorney, Agent, or Firm* — HAUPTMAN HAM, LLP

(57) ABSTRACT

An internal terminal is disposed inside a battery case and so as to be spaced apart from the battery case. An external terminal is disposed outside the battery case and spaced apart from the battery case, and the external terminal is connected to the internal terminal through a terminal mounting hole. An electrically insulating resin is disposed so as to fill a gap between the battery case and the internal terminal and a gap between the battery case and the external terminal, and the electrically insulating resin is joined to the battery case, to the internal terminal, and to the external terminal. At least one of the internal terminal and the external terminal includes a protruding portion protruding into the terminal mounting hole, and the internal terminal and the external terminal are joined to each other at a tip of the protruding portion.

17 Claims, 4 Drawing Sheets

(51) Int. Cl.
  *H01M 50/533* (2021.01)
  *H01M 50/543* (2021.01)
  *H01M 50/55* (2021.01)
  *H01M 50/557* (2021.01)
  *H01M 50/588* (2021.01)
  *H01M 50/591* (2021.01)

(52) U.S. Cl.
  CPC ......... *H01M 50/543* (2021.01); *H01M 50/55* (2021.01); *H01M 50/557* (2021.01); *H01M 50/588* (2021.01); *H01M 50/591* (2021.01)

(58) Field of Classification Search
  CPC .. H01M 50/543; H01M 50/55; H01M 50/557; H01M 50/588; H01M 50/591; H01M 50/553; H01M 50/103; H01M 50/172; H01M 50/184; H01M 50/188; H01M 50/564; H01M 50/567; H01M 50/181
  See application file for complete search history.

(56) References Cited

U.S. PATENT DOCUMENTS

| | | | |
|---|---|---|---|
| 2016/0043353 A1 | 2/2016 | Tsutsumi et al. | |
| 2016/0099457 A1 | 4/2016 | Park et al. | |
| 2016/0211051 A1 | 7/2016 | Kim et al. | |
| 2019/0109302 A1* | 4/2019 | Zheng | H01M 50/567 |
| 2019/0189995 A1 | 6/2019 | Nemoto et al. | |
| 2020/0280028 A1* | 9/2020 | Ehara | H01M 50/536 |
| 2020/0343522 A1* | 10/2020 | Zheng | H01M 50/557 |
| 2020/0411807 A1* | 12/2020 | Yang | H01M 50/566 |

FOREIGN PATENT DOCUMENTS

| | | | | |
|---|---|---|---|---|
| JP | 2002231197 A | | 8/2002 | |
| JP | 201089156 A | | 4/2010 | |
| JP | 2010089156 A | * | 4/2010 | |
| JP | 2011124024 A | | 6/2011 | |
| JP | 2011216396 A | | 10/2011 | |
| JP | 2012245665 A | | 12/2012 | |
| JP | 5476794 B2 | | 4/2014 | |
| JP | 2015060730 A | * | 3/2015 | |
| JP | 201571258 A | | 4/2015 | |
| JP | 6216368 B2 | | 10/2017 | |
| JP | 2018139190 A | | 9/2018 | |
| JP | 2019109972 A | | 7/2019 | |
| JP | 2019192520 A | | 10/2019 | |
| KR | 10-2018-0085141 A | | 7/2018 | |
| KR | 20180085141 A | * | 7/2018 | ............. H01M 2/04 |
| WO | 2017056733 A1 | | 4/2017 | |

OTHER PUBLICATIONS

English Translation of JP 2015060730A Connector terminal structure; Takasho Giken KK—Mar. 30, 2015 (Year: 2015).*

* cited by examiner

BATTERY AND METHOD OF MANUFACTURING SAME

CROSS REFERENCE TO RELATED APPLICATIONS

The present application claims priority from Japanese Patent Application No. 2020-190182 filed on Nov. 16, 2020, which is incorporated by reference herein in its entirety.

BACKGROUND

The present invention relates to a battery and a method of manufacturing the battery.

JP 2012-245665 A discloses a molding method of integrally molding a thermoplastic resin with a member made of metal or ceramic. According to the molding method disclosed in the publication, a B-staged or pre-gelled epoxy resin adhesive layer is pre-formed over the entire surface of the member made of metal or ceramic that is to be in contact with a thermoplastic resin, and thereafter, the thermoplastic resin is integrally formed with the just-mentioned member. This molding method may be, for example, an insert molding method in which a molten thermoplastic resin is placed in a mold so as to surround an insert member made of metal or ceramic and is solidified, to produce a molded product in which the insert member and the thermoplastic resin are integrated with each other. Alternatively, the molding method may be, for example, an outsert molding method in which a molten thermoplastic resin is molded on a portion of an outsert member made of metal or ceramic using a mold and is solidified, to produce a molded product in which the outsert member and the thermoplastic resin are integrated with each other. It is reported that this molding method can improve the air-tightness and liquid-tightness of an integrally molded product, including a lithium-ion battery lid, of various types of thermoplastic resins with members made of metal or ceramic, and can manufacture a product that exhibits excellent heat-resistant performance using a conventional molding method.

SUMMARY

The present inventor has conducted a research on a technique of integrating an electrode terminal and a battery case member together with a resin interposed therebetween by using insert molding. As for the electrode terminal, the inventor is investigating use of different kinds of metals for the material to be used for a current collector terminal inside the case and the material to be used for an outer part of the case. In the case of secondary batteries for mounting within vehicles, vibrations or the like affect the electrode terminals during traveling. When an electrode terminal and a battery case member are integrated with each other by interposing a resin therebetween using insert molding, it is to be noted that those members have different Young's moduli. For this reason, high stress may act on the interfaces between the resin and the electrode terminal and between the resin and the battery case member, which results from the stress acting on the electrode terminal. In view of this, the inventor is pursuing techniques of further strengthening the integrated structure and improving the battery product yield.

According to the present disclosure, a battery includes a battery case, an internal terminal, an external terminal, and an electrically insulating resin. The battery case includes at least one terminal mounting hole. The internal terminal is disposed inside the battery case and so as to be spaced apart from the battery case. The external terminal is disposed outside the battery case and spaced apart from the battery case, and the external terminal is connected to the internal terminal through the terminal mounting hole. The electrically insulating resin is disposed so as to fill a gap between the battery case and the internal terminal and a gap between the battery case and the external terminal, and the electrically insulating resin is joined to the battery case, to the internal terminal, and to the external terminal. At least one of the internal terminal and the external terminal includes a protruding portion protruding into the terminal mounting hole, and the internal terminal and the external terminal are joined to each other at a tip of the protruding portion.

The battery disclosed herein is able to reduce the defectives of the battery case occurring in leakage testing or in resistance testing, thus improving the product yield. It is also possible to reduce the part count for the part in which the internal terminal and the external terminal are fitted to the battery case.

The internal terminal may comprise a plate-shaped member. In this case, the internal terminal may include a protruding portion including a recess formed from inside of the battery case and being inserted into the terminal mounting hole, the protruding portion including a flat part at the tip. The flat part at the tip of the protruding portion may be joined to the external terminal.

The external terminal may be a plate-shaped member. The external terminal may include a plate-shaped member including a protruding portion including a recess formed from outside of the battery case and being inserted into the terminal mounting hole, the protruding portion including a flat part at the tip. The flat part at the tip of the protruding portion may be joined to the internal terminal.

The internal terminal may comprise a plate-shaped member, and the internal terminal may include a protruding portion including a recess formed from inside of the battery case and protruding toward the terminal mounting hole, the protruding portion including a flat part at the tip. The external terminal may comprise a plate-shaped member, and the external terminal may include a protruding portion including a recess formed from outside of the battery case and protruding toward the terminal mounting hole, the protruding portion including a flat part at the tip. The flat part at the tip of the protruding portion of the internal terminal and the flat part at the tip of the protruding portion of the external terminal may be joined to each other.

At least a portion of a part in which the electrically insulating resin is joined to the battery case, to the internal terminal, and to the external terminal may include a roughened surface having an arithmetical mean roughness of greater than or equal to 500 nm and less than or equal to 30 nm.

The electrically insulating resin may cover an inner surface facing inside the battery case in a location in which at least the internal terminal and the external terminal are joined to each other.

In another embodiment, the battery may further include an electrode assembly enclosed in the battery case, and at least a portion of the electrically insulating resin may be in contact with the electrode assembly.

A method of manufacturing a battery may include the steps of: preparing a battery case member including a terminal mounting hole; preparing an internal terminal and an external terminal, at least one of which including a protruding portion being inserted into the terminal mounting hole; joining the internal terminal and the external terminal together via the protruding portion with the protruding portion being inserted in the terminal mounting hole of the battery case member; and disposing the battery case member, the internal terminal, and the external terminal in a mold so as to form a gap between the battery case member and the internal terminal and between the battery case member and the external terminal, and filling an electrically insulating resin into the gap.

An embodiment of the method of manufacturing a battery may further include, prior to the step of joining the internal terminal and the external terminal together, roughening a surface of at least one member including the battery case member, the internal terminal, and the external terminal, wherein the step of roughening includes roughening a region of the at least one member into which the electrically insulating resin is to be filled.

DETAILED DESCRIPTION

Hereinbelow, embodiments of a battery and a method of manufacturing the battery according to the present disclosure are described in detail. It should be noted, however, that the disclosed embodiments are, of course, not intended to limit the invention. The present invention is not limited to the embodiments described herein unless specifically stated otherwise. The drawings are depicted schematically and do not necessarily reflect actual objects. The features and components that exhibit the same effects are denoted by the same reference symbols as appropriate, and the description thereof will not be repeated. Unless specifically stated otherwise, the recitation of numerical ranges in the present description, such as "X to Y", is meant to include any values between the upper limits and the lower limits, inclusive, that is, "greater than or equal to X to less than or equal to Y".

Battery 10

Figure 1:
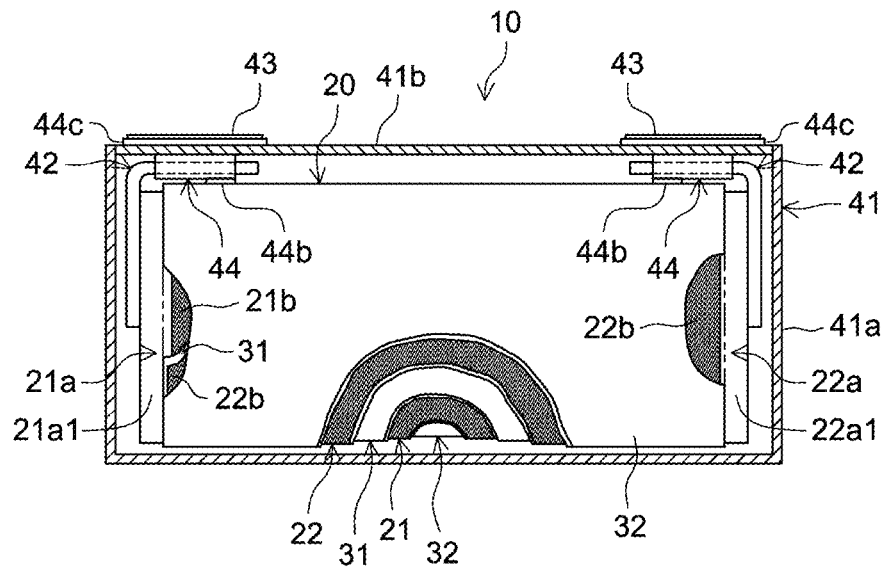
FIG. 1 is a partial cross-sectional view of a battery 10.
Figure 2:
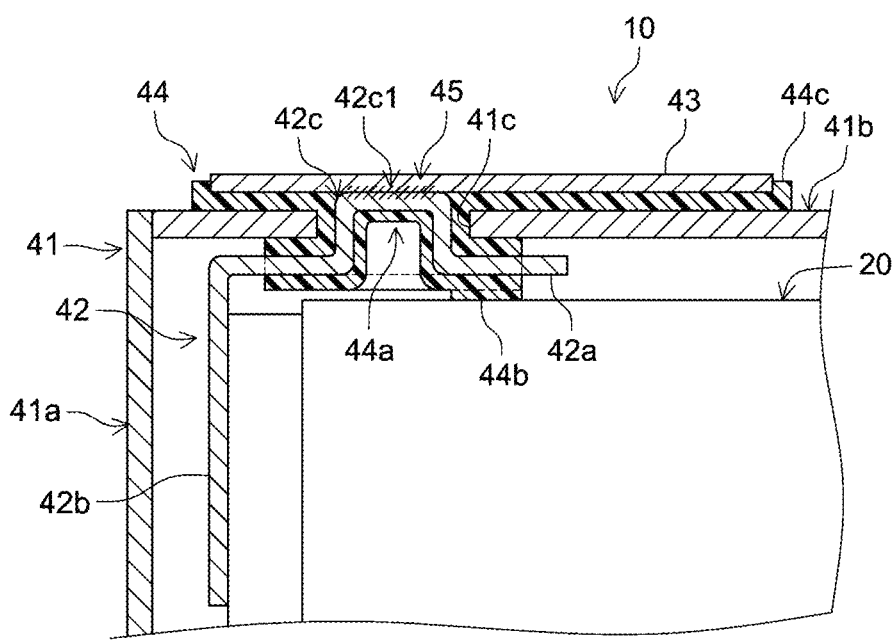
FIG. 2 is a partial cross-sectional view illustrating a portion where an internal terminal 42 and an external terminal 43 are fitted to a battery case 41.

FIG. 1 is a partial cross-sectional view of a battery 10. FIG. 1 depicts the battery interior that is exposed along one wide side surface of a battery case 41 in substantially a rectangular parallelepiped shape. FIG. 2 is a partial cross-sectional view illustrating a portion where an internal terminal 42 and an external terminal 43 are fitted to the battery case 41. The battery 10 shown in FIGS. 1 and 2 is what is called a sealed battery. Herein, embodiments of a battery and a method of manufacturing the battery are described using such a sealed battery as an example. As illustrated in FIGS. 1 and 2, the battery 10 includes an electrode assembly 20, a battery case 41, an internal terminal 42, an external terminal 43, and an electrically insulating resin 44.

Electrode Assembly 20

The electrode assembly 20 is covered with an insulating film (not shown) and is enclosed in the battery case 41. The electrode assembly 20 includes a positive electrode sheet 21 serving as a positive electrode element, a negative electrode sheet 22 serving as a negative electrode element, and separator sheets 31 and 32 serving as separators. Each of the positive electrode sheet 21, the first separator sheet 31, the negative electrode sheet 22, and the second separator sheet 32 is a long strip-shaped member.

The positive electrode sheet 21 includes a positive electrode current collector foil 21a (for example, an aluminum foil) having a predetermined width and a predetermined thickness, a positive electrode active material layer 21b containing a positive electrode active material, and an uncoated portion 21a1 defined along one lateral edge of the positive electrode current collector foil 21a with a constant width. The positive electrode active material layer 21b is formed on both faces of the positive electrode current collector foil 21a, except for the uncoated portion 21a1. In a lithium-ion secondary battery, for example, the positive electrode active material is a material that is capable of releasing lithium ions during charge and absorbing lithium ions during discharge, such as lithium-transition metal composite material. Generally, other than the lithium-transition metal composite material, various materials have been proposed for use as the positive electrode active material, and the positive electrode active material is not limited to any particular material.

The negative electrode sheet 22 includes a negative electrode current collector foil 22a (copper foil herein) having a predetermined width and a predetermined thickness, a negative electrode active material layer 22b containing a negative electrode active material, and an uncoated portion 22a1 defined along one lateral edge of the negative electrode current collector foil 22a with a constant width. The negative electrode active material layer 22b is formed on both faces of the negative electrode current collector foil 22a, except for the uncoated portion 22a1. In a lithium-ion secondary battery, for example, the negative electrode active material is a material that is capable of absorbing lithium ions during charge and releasing the absorbed lithium ions during discharge, such as graphite. Generally, other than graphite, various materials have been proposed for use as the negative electrode active material, and the negative electrode active material is not limited to any particular material.

Each of the separator sheets 31 and 32 may be formed of, for example, an electrolyte permeable porous resin sheet with required heat resistance. Various proposals have been made about the separator sheets 31 and 32, and there is no particular restriction on the separator sheets 31 and 32.

Here, the negative electrode active material layer 22b is formed, for example, so as to be wider than the positive electrode active material layer 21b. The width of the separator sheets 31 and 32 is wider than the width of the negative electrode active material layer 22b. The uncoated portion 21a1 of the positive electrode current collector foil 21a and the uncoated portion 22a1 of the negative electrode current collector foil 22a are arranged at laterally opposite ends. The positive electrode sheet 21, the first separator sheet 31, the negative electrode sheet 22, and the second separator sheet 32 are aligned longitudinally, stacked one on another, and wound together. The negative electrode active material layer 22b covers the positive electrode active material layer 21b with the separator sheets 31 and 32 interposed therebetween. The negative electrode active material layer 22b is covered with the separator sheets 31 and 32. The uncoated portion 21a1 of the positive electrode current collector foil 21a protrudes from one of the lateral edges of the separator sheets 31 and 32. The uncoated portion 22a1 of the negative electrode current collector foil 22a protrudes from the other one of the lateral edges of the separator sheets 31 and 32.

As illustrated in FIG. 1, the electrode assembly 20 is formed in a flattened shape along one plane containing the winding axis so that it can be enclosed in a case main body 41a of the battery case 41. Along the winding axis of the electrode assembly 20, the uncoated portion 21a1 of the positive electrode current collector foil 21a is disposed at one end, and the uncoated portion 22a1 of the negative electrode current collector foil 22a is disposed at the opposite end. The uncoated portion 21a1 of the positive electrode current collector foil 21a and the uncoated portion 22a1 of the negative electrode current collector foil 22a are attached to respective internal terminals 42, which are respectively attached to opposite longitudinal side-edge portions of a lid 41b. The electrode assembly 20 is fitted to the internal terminals 42, which are fitted to the lid 41b, in this manner, and the electrode assembly 20 is enclosed in the battery case 41. Although a wound electrode assembly is shown as an example, the structure of the electrode assembly is not limited to such an embodiment. For example, it is possible that the structure of the electrode assembly 20 may be a stacked structure in which positive electrode sheets and negative electrode sheets are alternately stacked on each other with separators interposed therebetween.

Battery Case 41

The battery case 41 includes a terminal mounting hole 41c (see FIG. 2). In this embodiment, the battery case 41 includes a case main body 41a and a lid 41b. The battery case may be made of aluminum or aluminum alloy, such as 1000 series aluminum alloy or 3000 series aluminum alloy. In this embodiment, the case main body 41a has a substantially flat rectangular parallelepiped shape, and has an opening in one face thereof that has longer sides and shorter sides. The lid 41b is a plate-shaped member that has a shape corresponding to the opening of the case main body 41a so as to be fitted to the opening. At the opposite longitudinal side-edge portions of the lid 41b, terminal mounting holes 41c are formed for mounting the internal terminal 42 and the external terminal 43. Herein, the terminal mounting holes 41c are formed in the lid 41b.

Internal Terminal 42

Herein, as illustrated in FIGS. 1 and 2, each of the internal terminals 42 is disposed inside the battery case 41 and spaced apart from the battery case 41. In this embodiment, the internal terminal 42 is a plate-shaped member, as illustrated in FIG. 2. The internal terminal 42 is disposed inside the battery case 41 and spaced apart from the lid 41b provided with a terminal mounting hole 41c. The internal terminal 42 includes a base portion 42a, a current collector portion 42b, and a protruding portion 42c. The base portion 42a extends along the lid 41b of the battery case 41. The current collector portion 42b extends from one end of the base portion 42a along one side of the electrode assembly 20 in a direction along the winding axis. The protruding portion 42c is provided in the base portion 42a and is inserted into the terminal mounting hole 41c of the lid 41b. The protruding portion 42c includes a recess formed from the inside of the base portion 42a, and protrudes outward. The protruding portion 42c includes a flat surface 42c1 at its tip.

External Terminal 43

Each of the external terminals 43 is disposed outside the battery case 41 and spaced apart from the battery case 41. The external terminal 43 is connected to the internal terminal 41 through the terminal mounting hole 41c. In this embodiment, as illustrated in FIG. 2, the external terminal 43 is a flat plate-shaped member. The external terminal 43 is disposed spaced apart from the lid 41b, which is provided with a terminal mounting hole 41c. The external terminal 43 is overlapped with the flat surface 42c1 of the protruding portion 42c of the internal terminal 42 that is inserted into the terminal mounting hole 41c, and the overlapped portions are joined together. As described above, the internal terminal 42 is a plate-shaped member in this embodiment. The base portion 42a of the internal terminal 42 includes the protruding portion 42c. The protruding portion 42c is provided with a recess formed from inside of the battery case 41 and is inserted into the terminal mounting hole 41c, and the protruding portion 42c includes a flat part at the tip. The flat part at the tip of the protruding portion 42c, i.e., the flat surface 42c1, is joined to the external terminal 43.

The internal terminal 42 and the external terminal 43 may be joined by, for example, solid phase bonding. Solid phase bonding serves to reduce the electrical resistance of a joining portion 45 in which the internal terminal 42 and the external terminal 43 are joined together. For solid phase bonding, it is possible to employ, for example, ultrasonic welding. In ultrasonic welding, the internal terminal 42 and the external terminal 43 are stacked on each other and sandwiched by a horn and an anvil, and the horn is vibrated. Thereby, the internal terminal 42 and the external terminal 43 stacked on each other are heated and softened without being fused while being kept in a solid phase (solid state), and the internal terminal 42 and the external terminal 43 are further pressed to undergo plastic deformation, whereby the internal terminal 42 and the external terminal 43 are joined to each other. Other than ultrasonic welding, various techniques of solid phase bonding may be employed, including cold pressure welding, hot pressure welding, and friction pressure welding. It should be noted that various techniques may be employed to join the internal terminal 42 and the external terminal 43 together, and those illustrated herein are merely exemplary. For example, the internal terminal 42 and the external terminal 43 may be welded together.

Electrically Insulating Resin 44

The electrically insulating resin 44 is disposed so as to fill a gap between the battery case 41 and the internal terminal 42 and a gap between the battery case 41 and the external terminal 43, and the electrically insulating resin 44 is joined to the battery case 41, to the internal terminal 42, and to the external terminal 43. The electrically insulating resin 44 used herein may include, for example, a polyphenylene sulfide (PPS) resin. The PPS resin is excellent in various aspects, such as heat resistance, chemical resistance, self-extinguishing capability, and dimensional stability. Herein, the PPS resin is illustrated merely as a suitable example of the material for the electrically insulating resin 44. It should be noted, however, that the electrically insulating resin 44 is not limited to the PPS resin unless specifically stated otherwise.

In the embodiment shown in FIG. 2, the electrically insulating resin 44 covers an inner surface of the internal terminal 42 that faces inside the battery case 41, in a joining portion 45 of the internal terminal 42 and the external terminal 43. In this embodiment, the electrically insulating resin 44 is formed along the inner surface of the internal terminal 42. Also, the inner surface of the joining portion 45 of the internal terminal 42 and the external terminal 43 is covered by the electrically insulating resin 44. As a result, the electrically insulating resin 44 prevents the joining portion 45 of the internal terminal 42 and the external terminal 43 from being exposed to the atmosphere and the electrolyte solution within the battery case 41. For this reason, the portion where the internal terminal 42 and the external terminal 43 are joined together does not deteriorate easily. Thus, the electrically insulating resin 44 may include a portion 44a that covers the joining portion 45 of the internal terminal 42 and the external terminal 43 inside the battery case 41.

Moreover, at least a portion of the electrically insulating resin 44 may be in contact with the electrode assembly 20. In the embodiment shown in FIG. 2, a portion of the electrically insulating resin 44 that covers the inner surface of the internal terminal 42 is provided with a contacting portion 44b bulging toward the inside of the battery case 41. Such a contacting portion 44b presses the electrode assembly 20 fitted to the internal terminal 42. As a result, the electrode assembly 20 becomes stable inside the battery case 41.

In this embodiment, the electrode assembly 20 is fitted to the current collector portion 42b of the internal terminal 42, which is secured to the lid 41b via the electrically insulating resin 44. Thus, an assembly unit is prepared in which the electrode assembly 20 is fitted to the internal terminal 42 secured to the lid 41b. As illustrated in FIG. 2, the shape of the electrically insulating resin 44 may be defined so that at least a portion of the electrically insulating resin 44 can be in contact with the electrode assembly 20. In the just-described assembly unit, the electrode assembly 20 is enclosed in the case main body 41a. In this case, the electrode assembly 20 fitted to the internal terminal 42 is pressed by the electrically insulating resin 44. This allows the electrode assembly 20 to be enclosed into the case main body 41a in an appropriate position easily.

Moreover, in this embodiment, the electrically insulating resin 44 surrounds the outer circumferential edge of the external terminal 43. This prevents the external terminal 43 from being displaced relative to the lid 41b. Thus, the electrically insulating resin 44 may include a restricting portion 44c that restricts the outer circumferential edge of the external terminal 43 from being displaced. In this embodiment, the restricting portion 44c extends upward along the outer circumferential edge of the external terminal 43 so as to surround the entire outer circumferential edge of the external terminal 43. However, the restricting portion 44c may not be provided around the entire circumferential edge of the external terminal 43, but may be provided partially around the circumferential edge of the external terminal 43 insofar as the external terminal 43 is restricted from displacement.

An embodiment of the battery 10 disclosed herein includes a battery case 41, an internal terminal 42, an external terminal 43, and an insulating resin 44. The battery case 41 includes a terminal mounting hole 41c. The internal terminal 42 is disposed inside the battery case 41 so as to be spaced apart from the battery case 41. The external terminal 43 is disposed outside the battery case 41 so as to be spaced apart from the battery case 41, and the external terminal 43 is connected to the internal terminal 41 through the terminal mounting hole 41c. The electrically insulating resin 44 is disposed so as to fill a gap between the battery case 41 and the internal terminal 42 and a gap between the battery case 41 and the external terminal 43, and the electrically insulating resin 44 is joined to the battery case 41, to the internal terminal 42, and to the external terminal 43. At least one of the internal terminal 42 and the external terminal 43 includes a protruding portion 42c protruding into the terminal mounting hole 41c, and the internal terminal 42 and the external terminal 43 are joined to each other at a tip of the protruding portion 42c.

With the battery 10 disclosed herein, the location in which the internal terminal 42 and the external terminal 43 are fitted to the battery case 41 is covered by the electrically insulating resin 44. This means that the stress acting on the joined part between the battery case 41 and the internal terminal 42 and the external terminal 43 is received by the entirety of the electrically insulating resin 44. This reduces the defectives of the battery case 41 occurring in leakage testing or resistance testing, thus improving the product yield. The part count is reduced for the part in which the internal terminal 42 and the external terminal 43 are fitted to the battery case 41.

Figure 3:
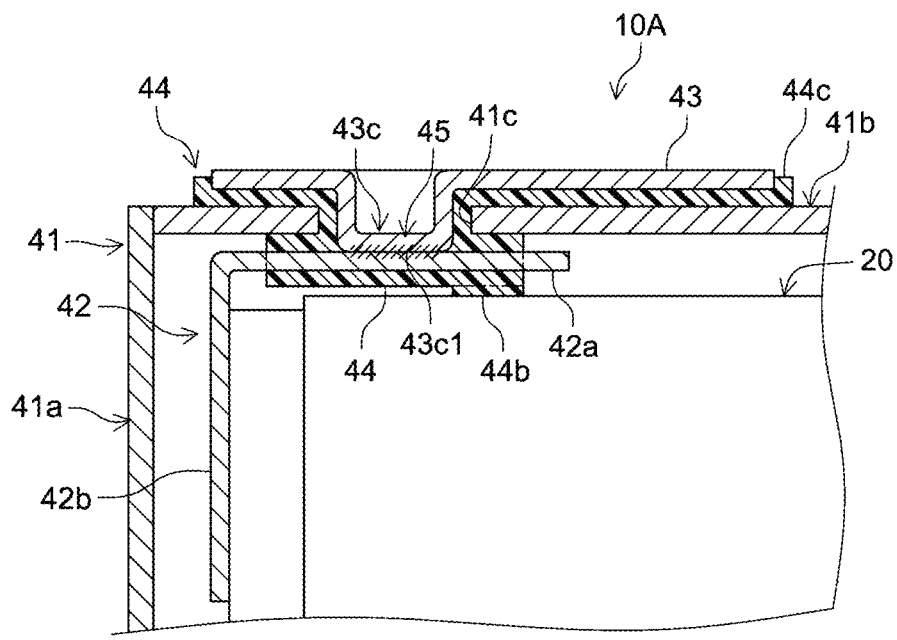
FIG. 3 is a partial cross-sectional view illustrating a battery 10A according to another embodiment of the disclosure.

The configuration of the battery 10 is not limited to the foregoing embodiments. FIG. 3 is a partial cross-sectional view illustrating a battery 10A according to another embodiment of the disclosure. As illustrated in FIG. 3, an external terminal 43 of the battery 10A is a plate-shaped member, and the external terminal 43 includes a protruding portion 43c that is provided with a recess formed from outside of the battery case 41 and is inserted into a terminal mounting hole 41c. The protruding portion 43c includes a flat part at the tip. On the other hand, a base portion 42a of an internal terminal 42 is constructed to be in a flat plate shape. The flat part 43c1 at the tip of the protruding portion 43c is overlapped on and joined to the internal terminal 42. In the embodiment shown in FIG. 3, an inner surface of the internal terminal 42 is covered by the electrically insulating resin 44. In particular, the electrically insulating resin 44 includes a portion 44a that covers a joining portion 45 of the internal terminal 42 and the external terminal 43 inside the battery case 41. In addition, a portion of the electrically insulating resin 44 is provided with a contacting portion 44b bulging toward the inside of the battery case 41 and being in contact with the electrode assembly 20.

Figure 4:
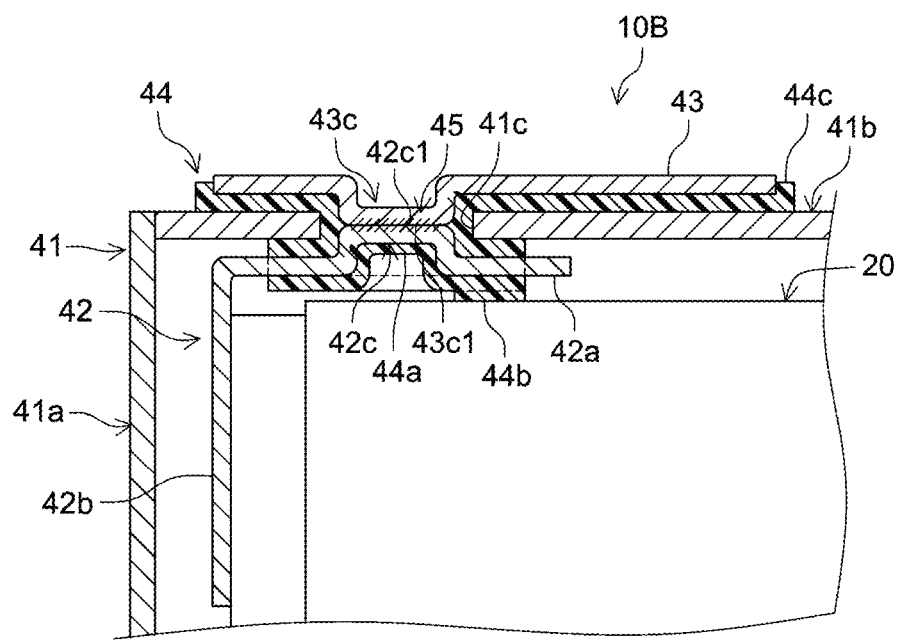
FIG. 4 is a partial cross-sectional view illustrating a battery 10B according to yet another embodiment of the disclosure.

FIG. 4 is a partial cross-sectional view illustrating a battery 10B according to yet another embodiment of the disclosure. As illustrated in FIG. 4, an internal terminal 42 of the battery 10B is a plate-shaped member, and the internal terminal 42 includes a protruding portion 42c including a recess formed from inside of the battery case 41 and protruding toward a terminal mounting hole 41c. The protruding portion 42c includes a flat part at the tip. An external terminal 43 is a plate-shaped member, and the external terminal 43 includes a protruding portion 43c including a recess formed from outside of the battery case 41 and protruding toward the terminal mounting hole 41c. The protruding portion 43c includes a flat part at the tip. The flat part 42c1 at the tip of the protruding portion 42c of the internal terminal 42 and the flat part 43c1 at the tip of the protruding portion 43c of the external terminal 43 are joined to each other. In the embodiment shown in FIG. 4, an inner surface of the internal terminal 42 is covered by the electrically insulating resin 44. In particular, the electrically insulating resin 44 includes a portion 44a that covers a joining portion 45 of the internal terminal 42 and the external terminal 43 inside the battery case 41. In addition, a portion of the electrically insulating resin 44 is provided with a contacting portion 44b bulging toward the inside of the battery case 41 and being in contact with the electrode assembly 20. As described above, various embodiments may be employed for the structures of the internal terminal 42 and the external terminal 43.

Surface Roughening

A roughened surface having an arithmetical mean roughness of 500 nm to 30 nm may be formed in at least a portion of a part in which the electrically insulating resin 44 is joined to the battery case 41 (the lid 41b in this embodiment), to the internal terminal 42, and to the external terminal 43. In the roughened surface that is formed in the part to which the resin is joined, minute surface irregularities may be formed by surface roughening, such as by laser irradiation or a chemical etching process. When a roughened surface is formed in the portion to which the electrically insulating resin 44 is to be joined, the joining strength of the electrically insulating resin 44 with the battery case 41 (the lid 41b in this embodiment), the internal terminal 42 and the external terminal 43 is improved. From the viewpoint of improving the joining strength of the electrically insulating resin 44, the arithmetical mean roughness of the surface irregularities in the surface roughening may be about 30 nm to about 500 nm. For example, according to the discovery by the present inventor, the arithmetical mean roughness of the surface irregularities in the surface roughening may be less than or equal to 450 nm, more preferably less than or equal to 400 nm, and greater than or equal to 40 nm, more preferably greater than or equal to 50 nm. For a member made of copper, the arithmetical mean roughness may be from about 60 nm to about 240 nm. For a member made of aluminum, the arithmetical mean roughness may be from about 48 nm to about 435 nm. The process of performing surface roughening for the portion to which the electrically insulating resin 44 is to be joined may be also referred to as a nano-anchoring process.

Method of Manufacturing Battery 10

An embodiment of the method of manufacturing the battery 10 may include the steps of preparing a battery case member, preparing an internal terminal and an external terminal, performing surface roughening, joining the internal terminal and the external terminal to each other, and filling an insulating resin.

Figure 5:
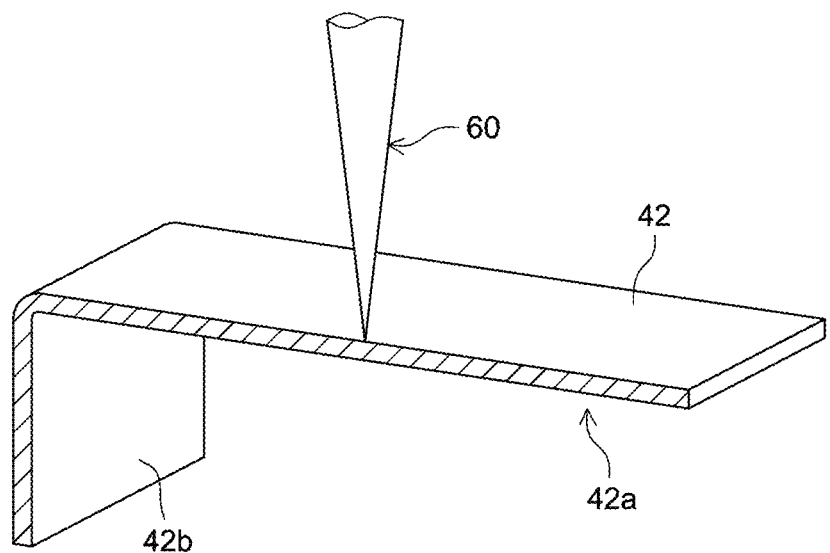
FIG. 5 is a perspective view for schematically illustrating a method of manufacturing a battery 10C.
Figure 6:
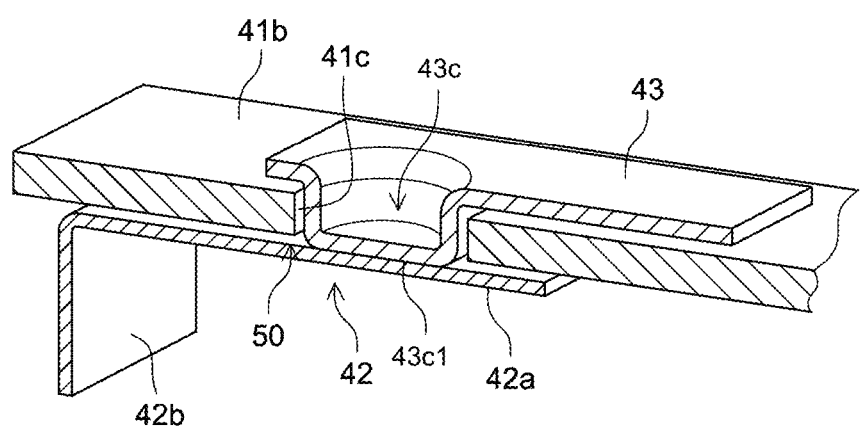
FIG. 6 is another perspective view for schematically illustrating the method of manufacturing the battery 10C.
Figure 7:
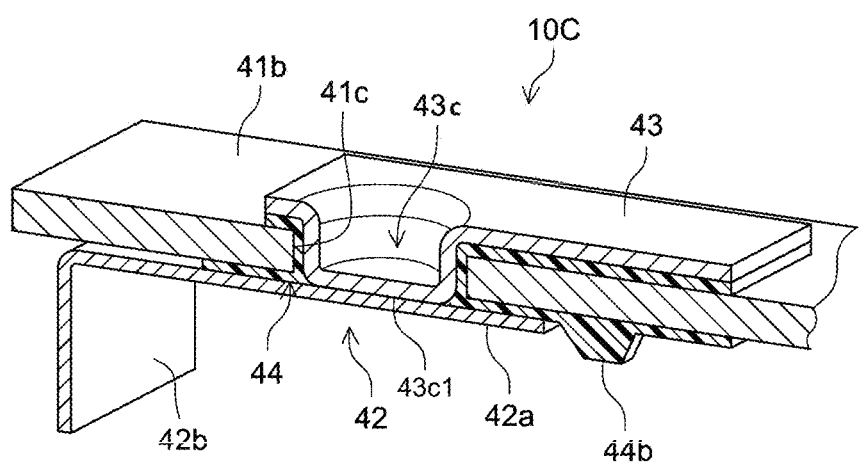
FIG. 7 is yet another perspective view for schematically illustrating the method of manufacturing the battery 10C.

FIGS. 5 to 7 are perspective views for schematically illustrating the method of manufacturing a battery 10C. The battery 10C shown in these figures is different from the embodiments shown in FIGS. 1 to 4. FIG. 5 illustrates the step of performing surface roughening to a prepared internal terminal 42. FIG. 6 illustrates the step of joining the internal terminal 42 and an external terminal 43 to each other. FIG. 7 illustrates the step of filling an insulating resin. It should be noted that the description here merely illustrates examples of the method of manufacturing the battery, and the structure of the battery to which the manufacturing method may be applied is not limited to the structure illustrated herein.

The step of preparing a battery case member involves preparing a battery case member including a terminal mounting hole 41c. In this embodiment, the prepared battery case member may be a lid 41b, as illustrated in FIG. 7. The lid 41b may be a plate-shaped member. The lid 41b is provided with a terminal mounting hole 41c having a required size at a predetermined position.

The step of preparing an internal terminal 42 and an external terminal 43 involves preparing an internal terminal 42 and an external terminal 43, at least one of which includes a protruding portion to be inserted into the terminal mounting hole 41c. In this embodiment, the external terminal 43 is provided with a protruding portion 43c to be inserted into the terminal mounting hole 41c, as illustrated in FIG. 7. On the other hand, a base portion 42a of an internal terminal 42 is constructed to be in a flat plate shape.

As illustrated in FIG. 5, the step of performing surface roughening involves, prior to the step of joining the internal terminal 42 and the external terminal 43 together, surface roughening is performed on a region of at least one member including the battery case member (the lid 41b herein), the internal terminal 42, and the external terminal 43 into which the electrically insulating resin 44 is to be filled. Referring to FIG. 5, the internal terminal 42 is irradiated with a laser beam 60, so that surface roughening with a predetermined roughness is performed for the location that forms the region in which the electrically insulating resin 44 is to be filled, i.e., the location to which the electrically insulating resin 44 is to be joined. Although the internal terminal 42 is illustrated here, the external terminal 43 and the lid 41b may be likewise subjected to surface roughening to obtain a predetermined roughness for the locations to which the electrically insulating resin 44 is to be joined. It should be noted that the surface roughening is not limited to being effected by laser beam irradiation, but may be achieved by a chemical etching process.

As illustrated in FIG. 6, in the step of joining the internal terminal 42 and the external terminal 43 together, the flat part 43c1 at the tip of the protruding portion 43c of the external terminal 43 is overlapped with and joined to the internal terminal 42. Here, the joining of the internal terminal 42 and the external terminal 43 may be achieved by welding or solid phase bonding, such as ultrasonic welding, as described above.

The step of filling the electrically insulating resin involves disposing the lid 41b, the internal terminal 42, and the external terminal 43 in a mold (not shown) so as to form a clearance gap 50 (see FIG. 6) between the battery case member (the lid 41b herein) and the internal terminal 42 and between the battery case member (the lid 41b herein) and the external terminal 43. Then, the electrically insulating resin 44 (see FIG. 7) is filled into the gap between the battery case member (the lid 41b herein) and the internal terminal 42 and between the battery case member (the lid 41b herein) and the external terminal 43. In the step of filling the electrically insulating resin 44, the lid 41b, the internal terminal 42, and the external terminal 43 are fixed in a predetermined arrangement inside the mold having a cavity space to be filled with the electrically insulating resin 44. Although not shown in the drawings, the mold is provided with wall surfaces defining a region (i.e., cavity space) to be filled with the electrically insulating resin 44.

In addition, the mold is provided with a sprue, a runner, a gate, and the like, for filling a resin into the cavity space. At the time when the internal terminal 42 and the external terminal 43 are placed in the mold, the internal terminal 42 and the external terminal 43 have already been joined together. Under this condition, the electrically insulating resin 44 is filled into the mold, and the electrically insulating resin 44 is molded into a predetermined shape. Thus, the electrically insulating resin 44 fills a clearance gap 50 (see FIG. 6) between the lid 41b and the internal terminal 42 and between the lid 41b and the external terminal 43. Consequently, the internal terminal 42 and the external terminal 43 are secured to the lid 41b by the electrically insulating resin 44.

In this embodiment, surface roughening is performed on a region of each of the lid 41b, the internal terminal 42, and the external terminal 43, in which the electrically insulating resin 44 is to be filled. This enables the electrically insulating resin 44 to be inserted into minute surface irregularities of the lid 41b, the internal terminal 42, and the external terminal 43. When the electrically insulating resin 44 is inserted into the minute surface irregularities of the lid 41*b*, the internal terminal 42, and the external terminal 43, the electrically insulating resin 44 inserted in the minute surface irregularities functions as a so-called nano-anchor. This serves to strengthen the joining of the electrically insulating resin 44 with the lid 41*b*, the internal terminal 42, and the external terminal 43. It should be noted that such surface roughening may be omitted when the internal terminal 42, the external terminal 43, the lid 41*b* are secured by the electrically insulating resin 44 with a sufficient strength.

As illustrated in FIG. 7, at least a portion of the electrically insulating resin 44 may be provided with a contacting portion 44*b* that is in contact with the electrode assembly 20. In this embodiment, the electrically insulating resin 44 juts out from the gap between the internal terminal 42 and the lid 41*b* along the inner surface of the lid 41*b*. The portion jutting out from the gap between the internal terminal 42 and the lid 41*b* is provided with a protuberance protruding inward of the battery case 41. Such a protuberance may be provided so as to come into contact with the electrode assembly 20 inside the battery case 41. Thus, the electrically insulating resin 44 may be provided with the contacting portion 44*b* that is in contact with the electrode assembly 20. The shape and position of the contacting portion 44*b* being in contact with the electrode assembly 20 may be varied in a number of ways. For example, the electrically insulating resin 44 may be provided with a portion 44*a* (see FIG. 2) that covers the joining portion 45 of the internal terminal 42 and the external terminal 43 inside the battery case 41, although it is not employed for the battery 10C shown in FIG. 7.

Various embodiments of the battery have been described hereinabove according the present disclosure. Unless specifically stated otherwise, the embodiments of the battery described herein do not limit the scope of the present invention. It should be noted that various other modifications and alterations may be possible in the embodiments of the battery disclosed herein. In addition, the features, structures, or steps described herein may be omitted as appropriate, or may be combined in any suitable combinations, unless specifically stated otherwise.

The invention claimed is:

1. A battery, comprising:
a battery case including a terminal mounting hole;
an internal terminal disposed inside the battery case and spaced apart from the battery case;
an external terminal disposed outside the battery case and spaced apart from the battery case, the external terminal connected to the internal terminal through the terminal mounting hole; and
a single piece of an electrically insulating resin disposed so as to fill a gap between the battery case and the internal terminal and a gap between the battery case and the external terminal, the single piece of the electrically insulating resin joined to the battery case, to the internal terminal, and to the external terminal, wherein
the internal terminal includes a protruding portion protruding into the terminal mounting hole,
the protruding portion includes a first surface defining a tip, and a second surface opposite to the first surface and defining a recess,
the internal terminal and the external terminal are joined to each other at the tip of the protruding portion, and
the single piece of the electrically insulating resin has a portion in contact with the second surface opposite to the tip of the protruding portion.

2. The battery according to claim 1, wherein
the internal terminal comprises a plate-shaped member,
the recess is open towards an inside of the battery case and is inserted into the terminal mounting hole, the protruding portion including a flat part at the tip, and
the flat part at the tip of the protruding portion is joined to the external terminal.

3. The battery according to claim 1, wherein:
the internal terminal comprises a plate-shaped member and includes the recess that is open towards an inside of the battery case, the protruding portion protruding toward the terminal mounting hole and including a flat part at the tip,
the external terminal comprises a further plate-shaped member and includes a further protruding portion,
the further protruding portion including a third surface defining a further tip, and a fourth surface opposite to the third surface and defining a further recess, the further recess being open towards an outside of the battery case, and
the further protruding portion protruding toward the terminal mounting hole and including a further flat part at the further tip, and
the flat part at the tip of the protruding portion of the internal terminal and the further flat part at the further tip of the further protruding portion of the external terminal are joined to each other.

4. The battery according to claim 1, wherein at least a portion of the battery case, the internal terminal, or the external terminal, to which the single piece of the electrically insulating resin is joined, includes a roughened surface having an arithmetical mean roughness of greater than or equal to 30 nm and less than or equal to 500 nm.

5. The battery according to claim 1, wherein the single piece of the electrically insulating resin covers an inner surface facing inside the battery case in a location in which at least the internal terminal and the external terminal are joined to each other.

6. The battery according to claim 1, further comprising:
an electrode assembly enclosed in the battery case, wherein
at least a portion of the single piece of the electrically insulating resin is in contact with the electrode assembly.

7. A method of manufacturing a battery, comprising the steps of:
preparing a battery case member including a terminal mounting hole;
preparing an internal terminal and an external terminal, the internal terminal including a protruding portion being inserted into the terminal mounting hole, the protruding portion including a first surface defining a tip, and a second surface opposite to the first surface and defining a recess;
joining the internal terminal and the external terminal together via the tip of the protruding portion, with the protruding portion being inserted in the terminal mounting hole of the battery case member;
disposing the battery case member, the internal terminal, and the external terminal in a mold so as to form a gap between the battery case member and the internal terminal and between the battery case member and the external terminal; and
filling an electrically insulating resin into the gap to form a single piece of the electrically insulating resin that is joined to the battery case member, to the internal terminal, and to the external terminal, wherein the single piece of the electrically insulating resin has a portion in contact with the second surface opposite to the tip of the protruding portion.

8. The method according to claim 7, further comprising, prior to the step of joining the internal terminal and the external terminal together, roughening a surface of at least one of the battery case member, the internal terminal, or the external terminal, wherein the roughening includes roughening a region of the at least one of the battery case member, the internal terminal or the external terminal, into which the electrically insulating resin is to be filled.

9. The method according to claim 7, wherein
the internal terminal comprises a plate-shaped member,
the recess is open towards an inside of the battery case and is inserted into the terminal mounting hole, the protruding portion including a flat part at the tip, and
in the step of joining the internal terminal and the external terminal together, the flat part at the tip of the protruding portion is joined to the external terminal.

10. The method according to claim 7, wherein
the internal terminal comprises a plate-shaped member and includes the recess that is open towards an inside of the battery case, the protruding portion protruding toward the terminal mounting hole and including a flat part at the tip,
the external terminal comprises a further plate-shaped member and includes a further protruding portion,
the further protruding portion including a third surface defining a further tip, and a fourth surface opposite to the third surface and defining a further recess, the further recess being open towards an outside of the battery case, and
the further protruding portion protruding toward the terminal mounting and including a further flat part at the further tip, and
in the step of joining the internal terminal and the external terminal together, the flat part at the tip of the protruding portion of the internal terminal and the further flat part at the further tip of the further protruding portion of the external terminal are joined to each other.

11. The method according to claim 7, wherein
the single piece of the electrically insulating resin covers an inner surface facing inside the battery case in a location in which at least the internal terminal and the external terminal are joined to each other.

12. The method according to claim 7, further comprising:
enclosing an electrode assembly in the battery case, wherein
at least a portion of the single piece of the electrically insulating resin is in contact with the electrode assembly.

13. The method according to claim 8, wherein
the at least one of the battery case, the internal terminal, or the external terminal, to which the single piece of the electrically insulating resin is joined, includes the roughened region having an arithmetical mean roughness of greater than or equal to 30 nm and less than or equal to 500 nm.

14. The battery according to claim 1, wherein
the battery case includes a lid, and
the single piece of the electrically insulating resin has
a first portion directly joined between the external terminal and an exterior surface of the lid,
a second portion directly joined between the internal terminal and an interior surface of the lid, and
a third portion disposed between an end surface of the lid and a side surface of the protruding portion, and continuously extending from the first portion to the second portion.

15. The method according to claim 7, wherein
the battery case member includes a lid, and
the step of filling the electrically insulating resin into the gap forms the single piece of the electrically insulating resin that has
a first portion directly joined between the external terminal and an exterior surface of the lid,
a second portion directly joined between the internal terminal and an interior surface of the lid, and
a third portion disposed between an end surface of the lid and a side surface of the protruding portion, and continuously extending from the first portion to the second portion.

16. The battery according to claim 6, wherein
the portion of the single piece of the electrically insulating resin, which is in contact with the electrode assembly, has a thickness greater than a thickness of the portion of the single piece of the electrically insulating resin in contact with the second surface opposite to the tip of the protruding portion.

17. The battery according to claim 1, further comprising an electrode assembly enclosed in the battery case, wherein
the battery case includes a lid,
the single piece of the electrically insulating resin has
a first portion directly joined between the external terminal and an exterior surface of the lid,
a second portion directly joined between the internal terminal and an interior surface of the lid,
a third portion disposed between an end surface of the lid and a side surface of the protruding portion, and continuously extending from the first portion to the second portion,
a fourth portion in contact with the electrode assembly, and
a fifth portion defined by the portion in contact with the second surface opposite to the tip of the protruding portion, and
the fourth portion of the single piece of the electrically insulating resin has a thickness greater than a thickness of the fifth portion of the single piece of the electrically insulating resin.

* * * * *